United States Patent
Koike et al.

(10) Patent No.: US 8,735,308 B2
(45) Date of Patent: May 27, 2014

(54) OPTICAL MEMBER COMPRISING TIO$_2$-CONTAINING SILICA GLASS

(75) Inventors: Akio Koike, Chiyoda-ku (JP); Chikaya Tamitsuji, Chiyoda-ku (JP); Kunio Watanabe, Chiyoda-ku (JP); Tomonori Ogawa, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 793 days.

(21) Appl. No.: 12/718,776

(22) Filed: Mar. 5, 2010

(65) Prior Publication Data
US 2010/0179047 A1 Jul. 15, 2010

Related U.S. Application Data

(63) Continuation of application No. PCT/JP2010/050286, filed on Jan. 13, 2010.

(30) Foreign Application Priority Data
Jan. 13, 2009 (JP) .................. 2009-004507

(51) Int. Cl.
C03C 15/00 (2006.01)
C03C 17/00 (2006.01)
C03C 19/00 (2006.01)
C03C 3/06 (2006.01)

(52) U.S. Cl.
USPC .................. 501/54; 65/30.1; 65/111

(58) Field of Classification Search
USPC .................. 501/53, 54; 65/30.1, 111
See application file for complete search history.

(56) References Cited

U.S. PATENT DOCUMENTS

| 7,294,595 | B2 | 11/2007 | Iwahashi et al. |
| 7,410,922 | B2 | 8/2008 | Iwahashi et al. |
| 7,419,924 | B2 | 9/2008 | Koike et al. |
| 7,429,546 | B2 | 9/2008 | Iwahashi et al. |
| 7,440,671 | B2 | 10/2008 | Sarukura et al. |
| 7,462,574 | B2 | 12/2008 | Iwahashi et al. |
| 7,485,593 | B2 | 2/2009 | Ezaki et al. |
| 7,538,052 | B2 | 5/2009 | Iwahashi et al. |
| 7,585,800 | B2 | 9/2009 | Kawata et al. |

(Continued)

FOREIGN PATENT DOCUMENTS

| JP | 2004-315351 | 11/2004 |
| JP | 2005-104820 | 4/2005 |

(Continued)

OTHER PUBLICATIONS

U.S. Appl. No. 13/486,485, filed Jun. 1, 2012, Koike, et al.

*Primary Examiner* — Noah Wiese
(74) *Attorney, Agent, or Firm* — Oblon, Spivak, McClelland, Maier & Neustadt, L.L.P.

(57) ABSTRACT

The present invention relates to an optical member including a TiO$_2$-containing silica glass having: a TiO$_2$ concentration of from 3 to 10% by mass; a Ti$^{3+}$ concentration of 100 wt ppm or less; a thermal expansion coefficient at from 0 to 100° C., CTE$_{0\text{-}100}$, of 0±150 ppb/° C.; and an internal transmittance in the wavelength range of 400 to 700 nm per a thickness of 1 mm, T$_{400\text{-}700}$, of 80% or more, in which the optical member has a ratio of variation of Ti$^{3+}$ concentration to an average value of the Ti$^{3+}$ concentration, $\Delta$Ti$^{3+}$/Ti$^{3+}$, on an optical use surface, is 0.2 or less.

19 Claims, 1 Drawing Sheet

(56) References Cited

U.S. PATENT DOCUMENTS

| | | |
|---|---|---|
| 2002/0157421 A1 | 10/2002 | Ackerman et al. |
| 2005/0032622 A1* | 2/2005 | Dawes et al. .................. 501/54 |
| 2005/0245382 A1* | 11/2005 | Iwahashi et al. ............... 501/54 |
| 2007/0042893 A1* | 2/2007 | Koike et al. .................... 501/54 |
| 2007/0207911 A1 | 9/2007 | Koike et al. |
| 2008/0096756 A1* | 4/2008 | Ezaki et al. .................. 501/134 |
| 2009/0242387 A1 | 10/2009 | Koike et al. |
| 2010/0028787 A1 | 2/2010 | Koike et al. |

FOREIGN PATENT DOCUMENTS

| | | |
|---|---|---|
| JP | 2006-103988 | 4/2006 |
| JP | 2006-210404 | 8/2006 |
| JP | 2008-505043 | 2/2008 |
| JP | 2008-100891 | 5/2008 |
| WO | 2009/107847 | 9/2009 |
| WO | 2009/107858 | 9/2009 |
| WO | 2009/107869 | 9/2009 |
| WO | 2009/107870 | 9/2009 |
| WO | 2009/116690 | 9/2009 |
| WO | 2009/128560 | 10/2009 |
| WO | 2009/145288 | 12/2009 |
| WO | WO 2010/041609 A1 | 4/2010 |

* cited by examiner

OPTICAL MEMBER COMPRISING TIO$_2$-CONTAINING SILICA GLASS

TECHNICAL FIELD

The present invention relates to an optical member comprising a TiO$_2$-containing silica glass and to a substrate for an optical member for EUV lithography comprising a transparent extremely low thermal expansion glass to be used as a photomask or a mirror for use in EUV lithography (hereinafter referred to as an optical member for EUVL). Also, it relates to an optical member comprising a TiO$_2$-containing silica glass suitable for use in various materials for which a low thermal expansibility and transparency are strictly required, for example, materials for optical parts, materials for large mirror reflectors, materials for precision parts such as verification standards for precise measurement, and various electronic materials. Incidentally, the EUV (Extreme UltraViolet) light as referred to in the invention refers to light having a wavelength range in a soft X-ray region or a vacuum ultraviolet region, specifically light having a wavelength of from about 0.2 to 100 nm.

BACKGROUND ART

Recently, in the photolithography technique, with the trend toward a higher degree of integration and a higher function of an integrated circuit, the refinement of the integrated circuit is advancing. The exposure tool is hence required to form a circuit pattern image with high resolution on a wafer surface at a long focal depth, and shortening of the wavelength of an exposure light source is being advanced. The exposure light source is further advancing from conventional g-line (wavelength: 436 nm), i-line (wavelength: 365 nm) and a KrF excimer laser (wavelength: 248 nm), and an ArF excimer layer (wavelength: 193 nm) is coming to be employed. In the lithography technique using such light having a wavelength of from 193 to 436 nm, semiconductor devices having a circuit size of 32 to 45 nm at best can be only manufactured.

Under the foregoing technical trends, a lithography technique typically using, as an exposure light source, light having a wavelength of 13 nm among EUV lights (extreme ultraviolet lights) is considered to be applicable for semiconductor devises over generations of a circuit size of 32 nm and thereafter, and is attracting attention. The principle of image formation in the EUV lithography (hereinafter abbreviated as "EUVL") is identical with that of the conventional lithography from the viewpoint that a mask pattern is transferred using a projection optical system. However, since there is no material capable of transmitting light therethrough in the EUV light energy region, a refractive optical system cannot be used. Accordingly, the optical systems are all reflecting optical systems.

The optical member for an exposure tool for use in EUVL is basically configured with (1) a substrate, (2) a reflective multilayer formed on the substrate, and (3) an absorber layer formed on the reflective multilayer. Since the optical member for an exposure tool for use in EUVL is reflecting type one, it is not always necessary for the substrate to have a light transmitting property. However, an extremely low thermal expansion material having transparency has been desired, in order to enable evaluation and inspection, for example, for evaluating homogeneity and surface smoothness using a interferometer or the like so as not to generate a strain even under irradiation with EUV light, or for judging the presence of internal defects such as bubbles and striae by inspection with a microscope or visual inspection.

Moreover, transparent low thermal expansion materials have been widely used in various materials for which a low thermal expansibility and transparency are strictly required, for example, materials for optical parts, materials for large mirror reflectors, materials for ring laser gyroscopes, materials for precision parts such as verification standards for precise measurement, and various electronic materials.

As the extremely low thermal expansion materials having transparency, there may be mentioned TiO$_2$-containing silica glasses (hereinafter referred to as "TiO$_2$—SiO$_2$ glass") represented by ULE #7972 (product name) of Corning Incorporated and transparent glass-ceramics represented by ZERODUR (product name) of SCHOTT. U.S. Patent Applications disclose methods in which a TiO$_2$—SiO$_2$ porous glass body is formed and converted into a glass body and then a mask substrate is obtained (e.g., see Patent Document 1).

The TiO$_2$—SiO$_2$ glass is known as an extremely low thermal expansion material having a thermal expansion coefficient lower than that of quartz glass. Also, since the thermal expansion coefficient can be controlled by the TiO$_2$ content in the glass, a zero-expansion glass whose thermal expansion coefficient is close to 0 can be obtained. Accordingly, the TiO$_2$—SiO$_2$ glass involves a possibility as a material to be used in an optical member for an exposure tool for EUVL. However, in the TiO$_2$—SiO$_2$ glass, the temperature region where the thermal expansion coefficient is substantially zero is only limited to around room temperature. Moreover, there is an absorption resulting from Ti$^{3+}$ at around 500 nm and thus the glass has a coloring property. In addition, since the glass contains a large amount of OH groups, there are absorptions at several wavelengths such as around 2700 nm.

Moreover, in the materials for optical parts, the materials for precision parts such as verification standards for precise measurement, and various electronic materials as well as optical members for exposure tools for EUVL, the temperature region where the thermal expansion coefficient is substantially zero is preferably wide. However, in the conventional TiO$_2$—SiO$_2$ glasses, the temperature region where the thermal expansion coefficient is substantially zero is only limited to around room temperature. Also, in the conventional glass-ceramics, since a dimensional change with a change in temperature shows hysteresis owing to structural relaxation, there is a problem in absolute dimensional accuracy and also there is a problem that a smooth surface is hardly obtained.

To the contrary, there is disclosed a TiO$_2$-containing silica glass which is excellent in transparency and whose thermal expansion coefficient is substantially zero in a wide temperature range and a process for producing the same (e.g., see Patent Document 2). Also, there is disclosed an F-containing TiO$_2$—SiO$_2$ glass having a zero-expansion property in a wider temperature region and a process for producing the same (e.g., see Patent Document 3).

[Patent Document 1] U.S. Patent Application Laid-Open No. 2002/157421
[Patent Document 2] JP-T-2008-505043
[Patent Document 3] JP-A-2005-104820

SUMMARY OF THE INVENTION

In conventional TiO$_2$—SiO$_2$ glasses, since distributions of coloring and absorption coefficient of the glasses have not been regulated, there is a case where variation in properties may occur in applications where transparency is necessary, such as materials for optical parts and materials for precise parts such as verification standards for precise measurement. Moreover, in optical members for EUVL, since the shape and the like are measured by a transmission interferometer, there is a problem that measured values may vary. Particularly, in the case of containing F, there is observed a tendency that distributions of coloring and absorption coefficient increase.

A first aspect of the invention provides an optical member comprising a $TiO_2$-containing silica glass having: a $TiO_2$ concentration of from 3 to 10% by mass; a $Ti^{3+}$ concentration of 100 wt ppm or less; a thermal expansion coefficient at from 0 to 100° C. (hereinafter referred to as thermal expansion coefficient $CTE_{0-100}$) of 0±150 ppb/° C.; and an internal transmittance in the wavelength region of 400 to 700 nm per a thickness of 1 mm (hereinafter referred to as internal transmittance $T_{400-700}$) of 80% or more, wherein the optical member has a ratio of variation of $Ti^{3+}$ concentration to an average value of the $Ti^{3+}$ concentration, $\Delta Ti^{3+}/Ti^{3+}$, on an optical use surface, of 0.2 or less.

A second aspect of the invention provides an optical member according to the first aspect, comprising a $TiO_2$-containing silica glass that contains F and has an F concentration of 1,000 wt ppm or more.

A third aspect provides an optical member according to the first or the second aspect, comprising a $TiO_2$-containing silica glass having an OH concentration of 600 wt ppm or less.

A fourth aspect provides an optical member according to any one of the first to the third aspects, comprising a $TiO_2$-containing silica glass having an internal transmittance in the wavelength range of 300 to 3,000 nm per a thickness of 1 mm (hereinafter referred to as internal transmittance $T_{300-3,000}$) of 70% or more.

A fifth aspect provides an optical member according to any one of the second to the fourth aspects, comprising a $TiO_2$-containing silica glass having a ratio of variation of F concentration to an average value of the F concentration (hereinafter referred to as $\Delta F/F$) on an optical use surface of 0.2 or less.

A sixth aspect provides an optical member according to any one of the first to the fifth aspects, comprising a $TiO_2$-containing silica glass having a distribution of temperature at which a thermal expansion coefficient is zero (hereinafter referred to as $\Delta COT$) falling within 5° C.

A seventh aspect provides an optical member according to any one of the first to the sixth aspects, which is for use in EUV lithography.

An eighth aspect provides a process for producing an optical member comprising a $TiO_2$-containing silica glass that has a ratio of variation of $Ti^{3+}$ concentration to an average value of the $Ti^{3+}$ concentration, $\Delta Ti^{3+}/Ti^{3+}$, on an optical use surface of 0.2 or less, containing F, and having an F concentration of 1,000 wt ppm or more, which process comprises:

a step of depositing and growing quartz glass fine particles obtainable by flame hydrolysis of glass-forming raw materials on a substrate, to thereby form a porous glass body;

a step of keeping said porous glass body in a reaction vessel filled with elemental fluorine ($F_2$) or a mixed gas obtained by diluting elemental fluorine ($F_2$) with an inert gas, to thereby obtain a fluorine-containing porous glass body; and a step of subjecting said fluorine-containing porous glass body to temperature increase to a transparent vitrification temperature, to thereby obtain a fluorine-containing transparent glass body.

According to the invention, it is possible to obtain an optical member comprising a transparent extremely low thermal expansion glass having a wide temperature region where the thermal expansion coefficient is substantially zero, excellent in transparency, and little in distribution of properties such as coloring and absorption coefficient. Therefore, the optical member is extremely suitable as an optical member constituting an optical system for use in EUVL.

Moreover, the optical member is suitable as a transparent extremely low thermal expansion glass to be used as various materials for which a low thermal expansibility and transparency are strictly required, for example, materials for optical parts, materials for large mirror reflectors, materials for precision parts such as verification standards for precise measurement, and various electronic materials.

MODE FOR CARRYING OUT THE INVENTION

Figure 1:
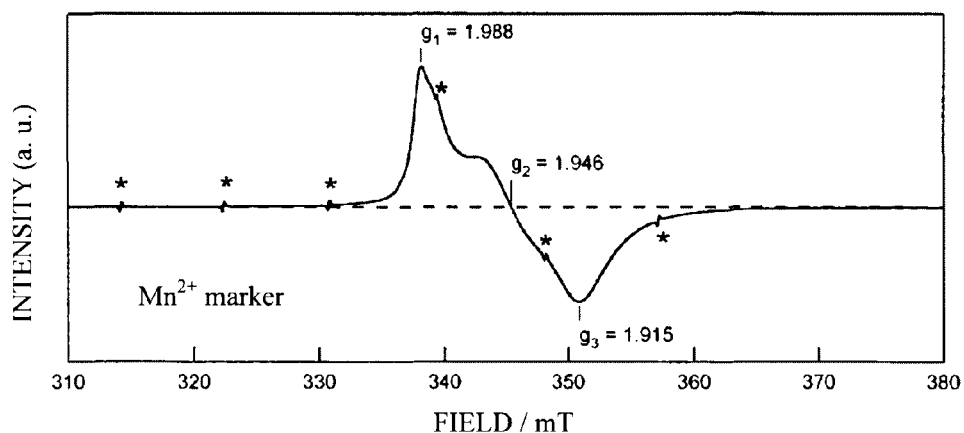
FIG. 1 is a figure showing a result of electron spin resonance (ESR: Electron Spin Resonance) measurement in one example of the glass of the invention.

It is known that a thermal expansion coefficient changes with a concentration of contained $TiO_2$ in a $TiO_2$—$SiO_2$ glass. The thermal expansion coefficient of a silica glass containing about 7% by mass of $TiO_2$ is substantially zero at around room temperature.

The $TiO_2$-containing silica glass to be used in the optical member of the invention ($TiO_2$—$SiO_2$ glass of the invention) is a silica glass containing 3 to 10% by mass of $TiO_2$. This is because there is a concern that zero expansion is not achieved when the content of $TiO_2$ is less than 3% by mass, and there is a possibility that the thermal expansion coefficient is negative when the content exceeds 10% by mass. The $TiO_2$ concentration is more preferably from 5 to 9% by mass, and especially preferably from 6 to 8% by mass.

The internal transmittance $T_{400-700}$ of the optical member of the invention is 80% or more. When $T_{400-700}$ is less than 80%, visible light is easily absorbed and thus there is a possibility that inconvenience occurs in inspection and evaluation such that the presence of internal defects such as bubbles and striae is difficult to judge by the inspection with a microscope or by visual inspection. Moreover, in the case of a member which is used with transmitting visible light, since intensity of transmitting light decreases with the use of the member, there is a possibility that the properties of parts are impaired. $T_{400-700}$ is preferably 85% or more, and especially preferably 90% or more.

The internal transmittance in the wavelength range of 300 to 700 nm per a thickness of 1 mm (hereinafter referred to as internal transmittance $T_{300-700}$) of the optical member of the invention is preferably 70% or more, more preferably 75% or more, and especially preferably 80% or more.

The internal transmittance $T_{300-3,000}$ of the optical member of the invention is preferably 70% or more and especially preferably 80% or more. When $T_{300-3,000}$ is less than 70%, there is a possibility that inconvenience occurs in inspection and evaluation such that it is hard to conduct the inspection for administrating homogeneity and surface smoothness by a measuring device using a laser interferometer. Moreover, in the case of a member which is used with transmitting visible light or infrared light, since intensity of transmitting light decreases, there is a possibility that properties of parts are impaired. Incidentally, since the optical member of the invention contains $TiO_2$, absorption end is present at around 250 nm. Therefore, light is not transmitted in the case of KrF excimer laser (wavelength of 248 nm) or ArF excimer laser (wavelength of 193 nm).

The transmittance can be measured with a mirror-polished glass having a thickness of 1 mm by using a spectrophotometer (U-3500 manufactured by Hitachi Corporation). For the calculation of the internal transmittance per a thickness of 1 mm, the transmittances of samples different in thickness which are subjected to the same degree of mirror polishing, for example, a sample having a thickness of 2 mm and a sample having a thickness of 1 mm, are measured respectively. After the transmittance is converted to absorbance, the absorbance of the sample having a thickness of 1 mm is subtracted from the absorbance of the sample having a thickness of 2 mm to determine absorbance per 1 mm, and the absorbance is reconverted into transmittance, thereby obtaining the internal transmittance per a thickness of 1 mm.

The $Ti^{3+}$ concentration of the optical member of the invention is 100 wt ppm or less. The present inventors have found out that the $Ti^{3+}$ concentration is relevant to coloring, particularly the internal transmittance $T_{400-700}$. Based on the result, when the $Ti^{3+}$ concentration exceeds 100 wt ppm, brown coloring occurs and the internal transmittance $T_{400-700}$ decreases, which may result in insufficiency as materials for which transparency is required. The $Ti^{3+}$ concentration is preferably 70 wt ppm or less, more preferably 50 wt ppm or less, and especially preferably 20 wt ppm or less.

The $Ti^{3+}$ concentration was determined based on ESR measurement. The measurement was carried out under the following conditions.

Frequency: around 9.44 GHz (X-band)
Output: 4 mW
Modulation magnetic field: 100 KHz, 0.2 mT
Measurement temperature: room temperature
ESR species integration range: 332 to 368 mT
Sensitivity calibration: carried out by a peak height of a certain amount of $Mn^{2+}/MgO$ An example of ESR measurement on a $TiO_2$—$SiO_2$ glass is shown in FIG. 1. The ordinate of FIG. 1 shows signal intensity and the abscissa thereof shows magnetic field intensity (mT). As a result of the measurement, the obtained signal (differential form) was a signal of a shape having anisotropy of $g_1=1.988$, $g_2=1.946$, and $g_3=1.915$. Since $Ti^{3+}$ in glass is usually observed at about g=1.9, they are considered to be signals derived from $Ti^{3+}$. The $Ti^{3+}$ concentration was determined by comparing the intensity after twice integration with the corresponding intensity after twice integration of a standard sample whose concentration was known.

The ratio of variation of $Ti^{3+}$ concentration to an average value of the $Ti^{3+}$ concentration, $\Delta Ti^{3+}/Ti^{3+}$, of the optical member of the invention is 0.2 or less. When $\Delta Ti^{3+}/Ti^{3+}$ exceeds 0.2, the distribution of properties such as coloring and an absorption coefficient increases. $\Delta Ti^{3+}/Ti^{3+}$ is more preferably 0.15 or less, further preferably 0.1 or less, and especially preferably 0.05 or less. When $\Delta Ti^{3+}/Ti^{3+}$ is 0.2 or less, the distribution of properties such as the distribution of coloring and an absorption coefficient decreases.

$\Delta Ti^{3+}/Ti^{3+}$ is determined by the following method.

The measurement of the $Ti^{3+}$ concentration is carried out at 10 mm intervals from one end to another end on an arbitrary line which passes through a center point of an optical use surface of the optical member or a film-formed surface in the case where a film is formed (hereinafter the optical use surface of the optical member and the film-formed surface in the case where a film is formed are collectively referred to as an optical use surface). A difference between a maximum value and a minimum value of the $Ti^{3+}$ concentration is designated by $\Delta Ti^{3+}$, and $\Delta Ti^{3+}/Ti^{3+}$ is determined by dividing $\Delta Ti^{3+}$ by an average value of the $Ti^{3+}$ concentration.

The thermal expansion coefficient at from 0 to 100° C. (hereinafter referred to as $CTE_{0-100}$) of the optical member of the invention is 0±150 ppb/° C. When an absolute value of the thermal expansion coefficient is 150 ppb/° C. or more, in the case where an extremely small thermal expansion coefficient is required, for example, in the case of the optical member for EUVL, thermal expansion is not negligible. $CTE_{0-100}$ is preferably 0±100 ppb/° C., more preferably 0±75 ppb/° C., and especially preferably 0±50 ppb/° C. Also, similarly, the thermal expansion coefficient at from −50 to 150° C. (hereinafter referred to as $CTE_{-50-150}$) is preferably 0±300 ppb/° C., more preferably 0±250 ppb/° C., further preferably 0±200 ppb/° C., and especially preferably 0±150 ppb/° C.

The distribution of a temperature at which the thermal expansion coefficient of the optical member of the invention is zero (hereinafter referred to as $\Delta COT$) is preferably 5° C. or less. $\Delta COT$ is more preferably 3° C. or less, further preferably 2° C. or less, and especially preferably 1° C. or less.

Moreover, in the optical member for EUVL of the invention, the average thermal expansion coefficient at 22.0° C. of glass (hereinafter referred to as $CTE_{22}$) is preferably 0±30 ppb/° C. $CTE_{22}$ is more preferably 0±20 ppb/° C., further preferably 0±10 ppb/° C., and especially preferably 0±5 ppb/° C.

Furthermore, in the $TiO_2$—$SiO_2$ glass of the invention whose thermal expansion coefficient is close to zero, the temperature width where the thermal expansion coefficient falls 0±5 ppb/° C. is widened by lowering a fictive temperature or incorporating F. In the case where the optical member is used in applications on which a change in the thermal expansion coefficient induced by a temperature change exerts an influence, for example, a material to be used as an optical material for an exposure tool for EUVL, the temperature width where the thermal expansion coefficient falls 0±5 ppb/° C. is preferably 4.0° C. or more and more preferably 4.5° C. or more. In the case where it is intended to widen the temperature width where the thermal expansion coefficient falls 0±5 ppb/° C., the temperature width is preferably 5.0° C. or more, more preferably 6.0° C. or more, and especially preferably 6.5° C. or more.

The thermal expansion coefficient can be measured, for example, by using a laser interferometric dilatometer (a laser dilatometer LIX-1 manufactured by ULVAC-RIKO Incorporation) in the range of from −150 to 200° C. For increasing the measuring accuracy of the thermal expansion coefficient, a method of measuring the thermal expansion coefficient several times and averaging the thermal expansion coefficients is effective. The temperature width where the thermal expansion coefficient falls 0±5 ppb/° C. can be derived by determining the range of temperature at which the thermal expansion coefficient is from −5 to 5 ppb/° C. from the curve of the thermal expansion coefficient obtained by the measurement.

The distribution of the thermal expansion coefficient is measured as follows. A glass in the region of from an optical use surface of the optical member to a depth of about 2 mm is cut out and the thermal expansion coefficient is measured by the above-mentioned method, and a temperature at which the thermal expansion coefficient is zero (hereinafter referred to as COT) is surmised. The measurement of the thermal expansion coefficient is carried out at 20 mm intervals from one end to another end on an arbitrary line which passes through a central point of the optical use surface. A difference between a maximum value and a minimum value of COT is designated by $\Delta COT$.

An OH group concentration of the optical member of the invention is preferably 600 wt ppm or less. When the OH group concentration exceeds 600 wt ppm, light transmittance in the wavelength band of near infrared region decreases owing to absorption resulting from the OH group and thus there is a concern that $T_{300-3,000}$ may become 70% or less. The OH group concentration is more preferably 400 wt ppm or less, further preferably 200 wt ppm or less, and especially preferably 100 wt ppm or less. Most preferred is 30 ppm wt or less.

The OH group concentration is measured as follows. Measurement is carried out by an infrared spectrophotometer to determine the OH group concentration from an absorption peak at a wavelength of 2.7 μm (J. P. Williams et al., Ceramic Bulletin, 55(5), 524, 1976). The detection limit by this method is 0.1 wt ppm.

The fictive temperature of the optical member of the invention is preferably 1,100° C. or lower. The inventors have found out that the fictive temperature and the width of zero-expansion temperature range relate to each other. Based on the result, when the fictive temperature exceeds 1,100° C., the zero-expansion temperature range is narrow and there is a concern that the optical member may be insufficient for a material to be used as an optical material for an exposure tool for EUVL. The fictive temperature is more preferably 1,000° C. or lower, further preferably 900° C. or lower, and especially preferably 850° C. or lower.

For obtaining the fictive temperature in the invention, for example, a method of heating at a temperature of 1,100° C. or higher and subsequently decreasing the temperature so that the average cooling rate at from 1,100 to 800° C. is 10° C./hr or lower, is effective.

The fictive temperature is measured as follows. An absorption spectrum is obtained on a mirror-polished $TiO_2$—$SiO_2$ glass by using an infrared spectrophotometer (Magna 760 manufactured by Nikolet). On this occasion, the data interval is about 0.5 $cm^{-1}$ and an average value after scanning 64 times is used for the absorption spectrum. In the thus obtained infrared absorption spectrum, the peak observed at around 2260 $cm^{-1}$ is derived from harmonic of stretching vibration induced by the Si—O—Si bond of the $TiO_2$—$SiO_2$ glass. Using the peak position, a calibration curve is prepared by a glass whose fictive temperature is known and which has the same composition and then the fictive temperature is determined.

The $TiO_2$—$SiO_2$ glass of the invention can contain F (fluorine). It is hitherto known that the F concentration influences the structural relaxation of a glass (Journal of Applied Physics 91(8), 4886 (2002)). According to the fact, structural relaxation time is accelerated by F and the glass structure having a low fictive temperature is easily realized (a first effect). Accordingly, the incorporation of a large amount of F into the $TiO_2$—$SiO_2$ glass has an effect of lowering the fictive temperature to widen the zero-expansion temperature range, according to previously-described relativity.

However, it is considered that the incorporation of F has an effect of widening the zero-expansion temperature range more than that assumed by lowering the fictive temperature (a second effect).

In the case where F is incorporated into the $TiO_2$—$SiO_2$ glass of the invention for the purpose of widening the zero-expansion temperature range, the F concentration is preferably 1,000 wt ppm or more. The F concentration is more preferably 2,000 wt ppm or more, further preferably 3,000 wt ppm or more, and especially preferably 4,000 wt ppm or more. In the case of the purpose for merely lowering the OH concentration, the F concentration is preferably 100 wt ppm or more, more preferably 200 wt ppm or more, and further preferably 500 wt ppm or more.

Moreover, as is similar to F, it is considered that the incorporation of a halogen other than F also has an effect of reducing the temperature change of the thermal expansion coefficient in a temperature range of from −50 to 150° C. to widen the temperature range where zero expansion is shown, on the $TiO_2$—$SiO_2$ glass.

As the method for manufacturing the F-containing $TiO_2$—$SiO_2$ glass, there are several processes as follows. As one example thereof, there is a soot process, in which the glass can be manufactured as follows. A $TiO_2$—$SiO_2$ glass fine particle (soot) obtained by flame hydrolysis or thermal decomposition of an Si precursor and a Ti precursor each serving as a glass-forming raw material is deposited and grown, thereby obtaining a porous $TiO_2$—$SiO_2$ glass body. The obtained porous $TiO_2$—$SiO_2$ glass body is treated in an F-containing atmosphere and then heated to a vitrification temperature or higher, thereby obtaining an F-containing $TiO_2$—$SiO_2$ glass body. Examples of the soot process include, depending upon the preparation manner, an MCVD process, an OVD process, and a VAD process.

As the soot process, there are manufacturing methods, in which F-containing materials are used as an Si precursor and a Ti precursor each serving as a glass-forming raw material, or an Si precursor and a Ti precursor are subjected to flame hydrolysis or thermal decomposition in an F-containing atmosphere to obtain an F-containing porous $TiO_2$—$SiO_2$ glass body, thereby obtaining an F-containing $TiO_2$—$SiO_2$ glass body.

Also, there is a manufacturing method by a direct process, in which F-containing materials are used as an Si precursor and a Ti precursor each serving as a glass-forming raw material, or an Si precursor and a Ti precursor are hydrolyzed and oxidized in an oxyhydrogen flame at from 1,800 to 2,000° C. in an F-containing atmosphere, thereby obtaining an F-containing $TiO_2$—$SiO_2$ glass body.

The measurement method of the F concentration is as follows. A glass is heated and melted with anhydrous sodium carbonate and then, distilled water and hydrochloric acid are added to the obtained melt liquid in an amount of 1 equivalent each as a volume ratio to the melt liquid to prepare a sample solution. Electromotive force of the sample solution is measured by means of a radiometer using No. 945-220 and No. 945-468 manufactured by Radiometer Trading Company as an F ion-selective electrode and a reference electrode, respectively. Then, the F content is determined based on a calibration curve which has been prepared using F ion standard solutions beforehand (Bulletin of the Chemical Society of Japan, 1972(2), 350). Incidentally, the detection limit by this method is 10 wt ppm.

The ratio of variation of F concentration to an average value of the F concentration, $\Delta F/F$, of the optical member of the invention is preferably 0.2 or less. When the optical member contains F, the formation of $Ti^{3+}$ is accelerated and coloring is facilitated but, when the F concentration is distributed, the $Ti^{3+}$ concentration is also distributed. Therefore, when $\Delta F/F$ exceeds 0.2, the distribution of properties such as coloring and absorption coefficient increases. Also, there is a concern that a distribution of the thermal expansion coefficient is generated and $\Delta COT$ increases. $\Delta F/F$ is more preferably 0.15 or less, further preferably 0.1 or less, and especially preferably 0.05 or less.

$\Delta F/F$ is measured by the following procedure. A glass in the region of from the optical use surface of the optical member or a film-formed surface in the case where a film is formed (hereinafter the optical use surface of the optical member and the film-formed surface in the case where a film is formed are collectively referred to as an optical use surface) to a depth of about 2 mm is cut out and the F concentration is measured according to the measurement method for the above-described F concentration. The measurement is carried out at 10 mm intervals from one end to another end on an arbitrary line which passes through a center point of the optical use surface. A difference between a maximum value and a minimum value of the F concentration is designated by ΔF, and ΔF/F is determined by dividing ΔF by the average value of the F concentration.

For the purpose of manufacturing the $TiO_2$—$SiO_2$ glass of the invention, the following manufacturing method can be adopted.

(a) Porous Glass Body Formation Step $TiO_2$—$SiO_2$ glass fine particles obtained through flame hydrolysis of an Si precursor and a Ti precursor each serving as a glass-forming raw material are deposited and grown on a base material, thereby forming a porous $TiO_2$—$SiO_2$ glass body. The glass-forming raw material is not particularly limited so far as it is a raw material capable of being gasified. Examples of the Si precursor include: halogenated silicon compounds which include chlorides such as $SiCl_4$, $SiHCl_3$, $SiH_2Cl_2$, and $SiH_3Cl$, fluorides such as $SiF_4$, $SiHF_3$, and $SiH_2F_2$, bromides such as $SiBr_4$ and $SiHBr_3$, and iodides such as $SiI_4$; and alkoxysilanes represented by $R_nSi(OR)_{4-n}$ (where R represents an alkyl group having from 1 to 4 carbon atoms; n represents an integer of from 0 to 3; and the plural R's may be the same or different from one another). Examples of the Ti precursor include: halogenated titanium compounds such as $TiCl_4$ and $TiBr_4$; and alkoxytitaniums represented by $R_nTi(OR)_{4-n}$ (where R represents an alkyl group having from 1 to 4 carbon atoms; n represents an integer of from 0 to 3; and the plural R's may be the same or different from one another). Also, as the Si precursor and the Ti precursor, a compound of Si and Ti such as a silicon titanium double alkoxide can be used.

In the step (a), a Ti precursor is subjected to flame hydrolysis with an oxyhydrogen flame or the like but it has been found out that $\Delta Ti^{3+}/Ti^{3+}$ is changed by gas conditions of the oxyhydrogen flame. This is attributable to the following mechanisms. The reaction of an Si precursor and a Ti precursor by the oxyhydrogen flame to form the $TiO_2$—$SiO_2$ glass fine particle includes direct oxidation by the reaction with oxygen and hydrolysis by the reaction of water formed through the combustion of oxygen and hydrogen. On this occasion, the hydrolysis reaction is dominant with the Si precursor such as $SiCl_4$, while the direct oxidation reaction is dominant with the Ti precursor such as $TiCl_4$. When the combustion is promoted to lower the oxygen concentration, the direct oxidation hardly occurs and the $Ti^{3+}$ concentration increases. In order to prevent it, it is effective to promote the direct oxidation by elevating combustion temperature through an increase in the flow rate of oxygen and hydrogen or to increase the oxygen concentration in the reaction field through an increase in the flow rate of oxygen. By carrying out the flame hydrolysis under such gas conditions, it becomes possible to decrease $\Delta Ti^{3+}/Ti^{3+}$. The value obtained by dividing the flow rate of oxygen by the flow rate of hydrogen $O_2/H_2$ is preferably 0.51 or more, more preferably 0.55 or more, further preferably 0.60 or more, and especially preferably 0.65 or more.

Moreover, in the case where F is incorporated, the following step can be inserted in the next place of the porous glass body formation step.

(b) F Incorporation Step

The porous glass body obtained in the above-described step (a) is kept in a reaction vessel filled with elemental fluorine ($F_2$) or a mixed gas obtained by diluting elemental fluorine ($F_2$) with an inert gas, thereby obtaining a fluorine-containing porous glass body.

In the step (b), elemental fluorine ($F_2$) is used as a fluorine source for introducing fluorine into the porous glass body. In the conventional method, a fluorine compound gas such as $SiF_4$ is used. In that case, the inventors have found out that ΔF/F increases and $\Delta Ti^{3+}/Ti^{3+}$ is apt to increase. Here, elemental fluorine ($F_2$) may be used as a mixed gas diluted with an inert gas, i.e., a gas inert against the reactions which occur at the introduction of fluorine into the porous glass body.

As the inert gas to be used in the mixed gas, specifically, nitrogen gas and a rare gas such as helium gas or argon gas may be mentioned. However, when water is contained in the inert gas, there is a possibility that water reacts with elemental fluorine ($F_2$) to form hydrogen fluoride and thus care must be taken. In this point of view, the dew point of the inert gas is preferably −10° C. or lower, more preferably −40° C. or lower, and especially preferably −60° C. or lower.

Incidentally, from the viewpoints of easiness in reaction control and economical efficiency, elemental fluorine ($F_2$) is preferably used as a mixed gas diluted with an inert gas and particularly, it is used as a mixed gas obtained by diluting elemental fluorine ($F_2$) with nitrogen gas.

In the case of the use as a mixed gas obtained by diluting elemental fluorine ($F_2$) with nitrogen gas, from the viewpoints of easiness in reaction control and economical efficiency, the concentration of elemental fluorine ($F_2$) is preferably from 100 mol ppm to 50 mol %, and more preferably from 1,000 mol ppm to 20 mol %. When the concentration of elemental fluorine ($F_2$) is less than 100 mol ppm, there is a concern that the rate of introducing fluorine into the porous glass body may decrease and thus the treating time may be prolonged. On the other hand, when the concentration exceeds 50 mol %, there is a concern that the rate of introducing fluorine into the porous glass body may be accelerated and thus the reaction control may become difficult.

As mentioned above, highly reactive elemental fluorine ($F_2$) is suitable as the fluorine source at the introduction of fluorine into the porous glass body and it is enabled to obtain a porous glass body containing 1,000 ppm or more of fluorine at a low temperature of 200° C. or lower. In the porous glass body, among the Si—O bonds in the $SiO_2$ network constituting the porous glass body, there are structurally unstable sites and also sites having unstable functional groups such as Si—OH. By bringing elemental fluorine ($F_2$) having higher reactivity than $SiF_4$ into contact with these bonds, the formation of Si—F bonds is accelerated, so that it is possible to introduce 1,000 ppm or more of fluorine into the porous glass body at a low temperature of 200° C. or lower.

However, in the case where elemental fluorine ($F_2$) is used as the fluorine source, there is a possibility that fluorine is eliminated by the heating treatment to be subsequently carried out for converting the porous glass body into a dense body and thus the fluorine concentration in the resulting transparent glass body decreases. Moreover, there is a possibility that water, volatile organic substances, and the like to be mixed in as impurities which may aggravate the distribution of the fluorine concentration react with elemental fluorine ($F_2$) to form HF and the formed HF may react with the network of Si—O—Si of the porous glass body to form Si—F together with new formation of Si—OH as a proton source. Furthermore, there is a problem that the thus formed Si—OH causes elimination of fluorine according to the following reaction at the transparent vitrification of the porous glass body. Thereby, there is a possibility that ΔF/F increases and also $\Delta Ti^{3+}/Ti^{3+}$ increases.

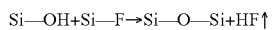

From the above points, the present inventors have found out that the amount of fluorine to be eliminated at the transparent vitrification of the porous glass body to which fluorine has been introduced can be reduced by methods such as a method of controlling Si—OH contained in the porous glass body to be treated, a method of reducing the distribution of bulk density, or a method of actively removing HF to be formed in the reaction field at the treatment of the porous glass body in an atmosphere containing elemental fluorine ($F_2$).

In the step (b), it is preferred to remove HF formed in the reaction field continuously or intermittently at the time of keeping the porous glass body in a reaction vessel filled with elemental fluorine ($F_2$) or a mixed gas obtained by diluting elemental fluorine ($F_2$) with an inert gas. As the method of continuously removing HF, there may be exemplified a method of adsorbing HF, formed in the reaction field, on a solid metal fluoride by keeping the glass body in a reaction vessel containing the solid metal fluoride, and a method of passing elemental fluorine ($F_2$) or a mixed gas obtained by diluting elemental fluorine ($F_2$) with an inert gas through the inside of the reaction vessel. Moreover, according to needs, HF can be intermittently removed by temporarily stopping either one or both supply and discharge of elemental fluorine ($F_2$) or a mixed gas obtained by diluting elemental fluorine ($F_2$) with an inert gas. Thereby, in the porous glass body, the new formation of Si—OH can be suppressed and a proton source in the porous glass body can be reduced. As a result, it is possible to suppress the elimination of the fluorine introduced into the porous glass body in this step at the transparent vitrification of the porous glass body in the step (c) to be subsequently carried out.

The solid metal fluoride to be used is not particularly limited but is preferably one selected from the group consisting of alkali metal fluorides, alkaline earth metal fluorides, and mixtures thereof. Among them, sodium fluoride is particularly preferred. The form of the solid metal fluoride is not particularly limited and any form suitable for disposing it in the reaction vessel can be selected.

In the step (b), the temperature in the reaction vessel is not particularly limited. However, the HF adsorbing ability of the solid metal fluoride is enhanced as the temperature in the reaction vessel is lowered, so that a lower temperature is preferred. From this viewpoint, the temperature in the reaction vessel is preferably 200° C. or lower, more preferably 150° C. or lower, and further preferably 100° C. or lower. On the other hand, when the temperature is higher, the diffusion of fluorine into the inside of the porous glass body easily proceeds and the higher temperature in the reaction vessel shortens the introduction reaction time of fluorine into the porous glass body, so that a higher temperature is preferred. From this viewpoint, the temperature in the reaction vessel is preferably −50° C. or higher, more preferably 0° C. or higher, and further preferably 20° C. or higher.

In the step (b), the pressure in the reaction vessel is not particularly limited. However, for efficient adsorption of HF, it is preferred to promote the diffusion of HF from the inside of the porous glass. From this viewpoint, a lower pressure in the reaction vessel is preferred. The pressure in the reaction vessel is preferably 1 MPa or lower, more preferably 0.6 MPa or lower, and further preferably 0.3 MPa or lower as a gauge pressure.

On the other hand, when the inside of the reaction vessel becomes reduced pressure, there is a possibility that outside air is sucked into the reaction vessel. Since water and volatile organic substances contained in the outside air react with elemental fluorine ($F_2$) to form HF, it is preferred to avoid the suction of the outside air. From this viewpoint, the pressure in the reaction vessel is preferably 0 MPa or higher as a gauge pressure.

In the reaction vessel of the step (b), the time for bringing elemental fluorine ($F_2$) into contact with the porous glass body is preferably from 1 minute to 1 week and particularly from 10 minutes to 2 days.

Furthermore, between the step (a) and the step (b), since fluorine can be homogeneously introduced into the porous glass body for a short period of time, it is preferred that a degassing treatment is carried out by keeping the inside of the reaction vessel having the porous glass body disposed therein under reduced pressure (preferably 13,000 Pa or lower and particularly 1,300 Pa or lower) and then elemental fluorine ($F_2$) is introduced until a prescribed pressure is attained.

Incidentally, between the step (a) and the step (b), water and volatile organic substances present in the reaction vessel can be removed by a degassing treatment with keeping the inside of the reaction vessel having the porous glass body disposed therein under reduced pressure. Thereby, the generation of hydrogen fluoride by the reaction of elemental fluorine with the water or the volatile organic substances can be prevented. Moreover, in order to efficiently conduct the degassing treatment, heating is preferred. The heating temperature is preferably from 50° C. to 300° C., more preferably from 50° C. to 200° C., and especially preferably from 50° C. to 150° C.

Furthermore, between the step (a) and the step (b), in order to increase the bulk density of the porous glass body, it is preferred to carry out presintering.

At the stage of the porous glass body, Si—OH is considered to be present on the surface of the particle. It is considered that the specific surface area of the particle decreases and relatively, the amount of Si—OH present on the porous glass body decreases as the bulk density increases. Namely, it is considered that, as the bulk density of the porous glass body increases, the amount of Si—OH present on the porous glass body decreases and relatively, the amount of HF formed when the porous glass body is brought into contact with elemental fluorine ($F_2$) decreases. As a result, the elimination of fluorine in the step (d) to be subsequently carried out can be suppressed and it becomes possible to reduce $\Delta F/F$ and thus to reduce $\Delta Ti^{3+}/Ti^{3+}$.

In the case where the presintering is carried out for such a purpose, it is preferred to conduct it at a temperature of 1,100° C. or higher. At a temperature of lower than 1,100° C., there is a concern that sintering of the particles does not proceed and the bulk density does not change. More preferred is 1,150° C. or higher.

The presintering is preferably carried out at a temperature of 1,100° C. or higher for 2 hours or more. More preferred is 3 hours or more and further preferred is 4 hours or more.

On the other hand, the presintering is preferably carried out at a temperature of 1,350° C. or lower. In the case where the temperature exceeds 1,350° C., since the presintering exceedingly proceeds and closed pores are present, there is a concern that variation in the fluorine concentration occurs at the introduction of fluorine into the porous glass body in the step (b) or bubbles remain after the transparent vitrification in the step (d). More preferred is 1,300° C. or lower.

(c) Densification Step

The porous glass body obtained in the step (a) or the fluorine-containing porous glass body obtained in the step (b) is subjected to temperature increase to a densification temperature, thereby obtaining a $TiO_2$—$SiO_2$ dense body containing substantially no bubbles and air bubbles. The densification temperature as referred to in this specification means a temperature at which the porous glass body can be densified to such an extent that a void cannot be confirmed by an optical microscope. The densification temperature is preferably from 1,100 to 1,750° C. and more preferably from 1,200 to 1,550° C.

As the atmosphere, in the case of normal pressure, an atmosphere of 100% of an inert gas such as helium or an atmosphere containing an inert gas such as helium as a major component is preferred. In the case of reduced pressure, the atmosphere is not particularly limited.

(d) Vitrification Step

The $TiO_2$—$SiO_2$ dense body obtained in the densification step is subjected to temperature increase to the vitrification temperature, thereby obtaining a transparent glass body containing substantially no crystalline component. The vitrification temperature is preferably from 1,400 to 1,750° C. and more preferably from 1,500 to 1,700° C.

The atmosphere is not particularly limited but, the same atmosphere as in the densification step, i.e., in the case of normal pressure, an atmosphere of 100% of an inert gas such as helium or an atmosphere containing an inert gas such as helium as a major component, is preferred. In the case of a reduced pressure, the densification step and the vitrification step can be carried out simultaneously.

(e) Forming Step

The transparent glass body obtained in the step (d) is heated at a temperature of the softening point or higher and formed in a desired shape, thereby obtaining a formed glass body. The forming temperature is preferably from 1,500 to 1,800° C. When the forming temperature is 1,500° C. or higher, the viscosity of the transparent $TiO_2$—$SiO_2$ glass is sufficiently lowered so that deformation due to own weight substantially proceed. Also, the growth of cristobalite which is a crystal phase of $SiO_2$, or the growth of rutile or anatase which is a crystal phase of $TiO_2$ hardly occur, thereby the occurrence of so-called devitrification can be prevented. Also, at 1,800° C. or lower, sublimation of $SiO_2$ can be suppressed.

Incidentally, the step (d) and the step (e) can be carried out continuously or simultaneously.

Moreover, with regard to the $TiO_2$—$SiO_2$ dense body obtained in the densification step, by carrying out the forming step without conducting the vitrification step, the vitrification step can be omitted. Namely, vitrification and forming can be carried out simultaneously in the forming step. The atmosphere is not particularly limited.

In order to control the slow cooling and fictive temperature of the glass of the invention, the following manufacturing method can be adopted.

(f) Annealing Step

The transparent glass body obtained in the step (d) or the formed glass body obtained in the step (e) is heated at a temperature of 1,100° C. or higher and then subjected to an annealing treatment for decreasing the temperature to 500° C. or lower at an average cooling rate of 10° C./hr or lower, thereby controlling the fictive temperature of the glass. Alternatively, in the cooling process from a temperature of 1,200° C. or higher in the step (d) or the step (e), the obtained transparent glass body or formed glass body is subjected to an annealing treatment for decreasing the temperature from 1,200° C. to 500° C. at an average cooling rate of 10° C./hr or lower, thereby controlling the fictive temperature of the glass. Furthermore, the average cooling rate at from 1,100 to 800° C. is preferably 10° C./hr or lower, more preferably 5° C./hr or lower, especially preferably 3° C./hr or lower, and most preferably 1° C./hr or lower.

EXAMPLES

The following will illustrate the invention in further detail with reference to Examples but the invention is not limited thereto.

Example 1

$TiO_2$—$SiO_2$ glass fine particles obtainable by gasifying $TiCl_4$ and $SiCl_4$ each serving as a glass-forming raw material of a $TiO_2$—$SiO_2$ glass, respectively, then mixing them, and subjecting the mixture to heat hydrolysis (flame hydrolysis) in an oxyhydrogen flame was deposited and grown on a substrate, thereby forming a porous $TiO_2$—$SiO_2$ glass body. On this occasion, the ratio of the flow rate of oxygen to the flow rate of hydrogen was set at $O_2/H_2=0.68$ (step (a)).

Since it is hard to handle the obtained porous $TiO_2$—$SiO_2$ glass body without any treatment, the porous $TiO_2$—$SiO_2$ glass body was kept in the air at 1,200° C. for 4 hours in a state still deposited on the substrate and then separated from the substrate (presintering step).

Thereafter, the resulting glass body was kept at 1,450° C. in an atmosphere of 100% of He for 4 hours, thereby obtaining a $TiO_2$—$SiO_2$ dense body (step (c)).

The obtained $TiO_2$—$SiO_2$ dense body was kept at 1,680° C. for 4 hours, thereby obtaining a transparent glass body (step (d)).

The obtained transparent glass body was placed in a carbon mold and heated to 1,700° C. to be formed in a block shape, thereby obtaining a formed glass body (step (e)).

After the obtained formed glass body was kept at 1,100° C. for 5 hours, it was subjected to temperature decrease to 900° C. at a rate of 1° C./hr and then to temperature decrease to 500° C. at a rate of 5° C./hr, followed by allowing it to stand for natural cooling (step (f)).

Example 2

$TiO_2$—$SiO_2$ glass fine particles obtainable by gasifying $TiCl_4$ and $SiCl_4$ each serving as a glass-forming raw material of a $TiO_2$—$SiO_2$ glass, respectively, then mixing them, and subjecting the mixture to heat hydrolysis (flame hydrolysis) in an oxyhydrogen flame was deposited and grown on a substrate, thereby forming a porous $TiO_2$—$SiO_2$ glass body. On this occasion, the ratio of the flow rate of oxygen to the flow rate of hydrogen was set at $O_2/H_2=0.56$ (step (a)).

Since it is hard to handle the obtained porous $TiO_2$—$SiO_2$ glass body without any treatment, the porous $TiO_2$—$SiO_2$ glass body was kept in the air at 1,200° C. for 4 hours in a state still deposited on the substrate and then separated from the substrate (presintering step).

The obtained porous $TiO_2$—$SiO_2$ glass body was supported with a PFA-made jig and was then placed in a nickel autoclave (A/C) together with the jig. Then, after an NaF pellet (manufactured by Stella Chemifa Corporation) was inserted into the autoclave so as not to come into contact with the porous $TiO_2$—$SiO_2$ glass body, the system was heated from the outside of the autoclave using an oil bath to increase the temperature to 80° C.

Thereafter, while the inside of the apparatus was kept at 80° C., vacuum deaeration was carried out until the pressure in the apparatus reached an absolute pressure of 266 Pa or lower and the system was kept for 1 hour.

Then, a gas of elemental fluorine ($F_2$) diluted to 20% by volume with nitrogen gas was introduced until the pressure in the apparatus reached a gauge pressure of 0.18 MPa and, after the temperature was increased to 80° C., the system was kept for 24 hours, thereby fluorine being introduced into the porous $TiO_2$—$SiO_2$ glass body (step (b)).

Thereafter, the resulting glass body was kept at 1,450° C. in a reduced pressure for 4 hours, thereby obtaining an F-containing $TiO_2$—$SiO_2$ dense body (step (c)).

The obtained F-containing $TiO_2$—$SiO_2$ dense body was kept at 1,680° C. for 4 hours, thereby obtaining a transparent glass body (step (d)).

The obtained transparent glass body was placed in a carbon mold and heated to 1,700° C. to be formed in a block shape, thereby obtaining a formed glass body (step (e)).

After the obtained formed glass body was heated to 1,200° C., it was subjected to temperature decrease from 1,200° C. to 500° C. at a rate of 5° C./hr, followed by allowing it to stand for natural cooling (step (f)).

Example 3

$TiO_2$—$SiO_2$ glass fine particles obtainable by gasifying $TiCl_4$ and $SiCl_4$ each serving as a glass-forming raw material of a $TiO_2$—$SiO_2$ glass, respectively, then mixing them, and subjecting the mixture to heat hydrolysis (flame hydrolysis) in an oxyhydrogen flame was deposited and grown on a substrate, thereby forming a porous $TiO_2$—$SiO_2$ glass body. On this occasion, the ratio of the flow rate of oxygen to the flow rate of hydrogen was set at $O_2/H_2$=0.50 (step (a)).

Since it is hard to handle the obtained porous $TiO_2$—$SiO_2$ glass body without any treatment, the porous $TiO_2$—$SiO_2$ glass body was kept in the air at 1,200° C. for 4 hours in a state still deposited on the substrate and then separated from the substrate (presintering step).

Thereafter, the resulting glass body was kept at 1,450° C. in an atmosphere of 100% of He for 4 hours, thereby obtaining a $TiO_2$—$SiO_2$ dense body (step (c)).

The obtained $TiO_2$—$SiO_2$ dense body was kept at 1,680° C. for 4 hours, thereby obtaining a transparent glass body (step (d)).

The obtained transparent glass body was placed in a carbon mold and heated to 1,700° C. to be formed in a block shape, thereby obtaining a formed glass body (step (e)).

The obtained formed glass body was allowed to stand for natural cooling to room temperature in the furnace without any treatment. At that time, the average cooling rate from 1,200° C. to 500° C. was 160° C./hr (step (f)).

Example 4

$TiO_2$—$SiO_2$ glass fine particles obtainable by gasifying $TiCl_4$ and $SiCl_4$ each serving as a glass-forming raw material of a $TiO_2$—$SiO_2$ glass, respectively, then mixing them, and subjecting the mixture to heat hydrolysis (flame hydrolysis) in an oxyhydrogen flame was deposited and grown on a substrate, thereby forming a porous $TiO_2$—$SiO_2$ glass body. On this occasion, the ratio of the flow rate of oxygen to the flow rate of hydrogen was set at $O_2/H_2$=0.56 (step (a)).

Since it is hard to handle the obtained porous $TiO_2$—$SiO_2$ glass body without any treatment, the porous $TiO_2$—$SiO_2$ glass body was kept in the air at 1,200° C. for 4 hours in a state still deposited on the substrate and then separated from the substrate (presintering step).

Thereafter, the porous $TiO_2$—$SiO_2$ glass body was placed in an atmosphere-controllable electric furnace, and the pressure was reduced to 10 Torr (1,333 Pa) at room temperature. Then, while a mixed gas of $O_2/SiF_4$=90/10 (volume ratio) was introduced, the system was kept in this atmosphere at 1,000° C. under normal pressure for 4 hours, thereby carrying out F-doping (step (b)).

Furthermore, the temperature was increased to 1050° C. in an atmosphere of 100% of $O_2$ and the system was kept under normal pressure for 30 hours (oxygen treatment step).

Thereafter, the resulting glass body was kept at 1,450° C. in an atmosphere of 100% of He for 4 hours, thereby obtaining an F-containing $TiO_2$—$SiO_2$ dense body (step (c)).

The obtained F-containing $TiO_2$—$SiO_2$ dense body was kept in the air at 1,650° C. for 4 hours, thereby obtaining a transparent glass body (step (d)).

The obtained transparent glass body was placed in a carbon mold and heated to 1,650° C. to be formed in a block shape, thereby obtaining a formed glass body (step (e)).

After the obtained formed glass body was heated to 1,200° C., it was subjected to temperature decrease from 1,200° C. to 500° C. at a rate of 5° C./hr, followed by allowing it to stand for natural cooling (step (f)).

Example 5

$TiO_2$—$SiO_2$ glass fine particles obtainable by gasifying $TiCl_4$ and $SiCl_4$ each serving as a glass-forming raw material of a $TiO_2$—$SiO_2$ glass, respectively, then mixing them, and subjecting the mixture to heat hydrolysis (flame hydrolysis) in an oxyhydrogen flame was deposited and grown on a substrate, thereby forming a porous $TiO_2$—$SiO_2$ glass body. On this occasion, the ratio of the flow rate of oxygen to the flow rate of hydrogen was set at $O_2/H_2$=0.76 (step (a)).

Since it is hard to handle the obtained porous $TiO_2$—$SiO_2$ glass body without any treatment, the obtained porous $TiO_2$—$SiO_2$ glass body was kept in the air at 1,200° C. for 4 hours in a state still deposited on the substrate and then separated from the substrate, thereby forming a porous $TiO_2$—$SiO_2$ glass body having a diameter of about 200 mm and a length of about 300 mm (presintering step).

Then, 3.8 kg of the porous $TiO_2$—$SiO_2$ glass body obtained by the above procedure was supported with a SUS316L-made jig and was then placed in a SUS316L-made autoclave (A/C) (volume: 50 L) together with the jig. Then, 300 g of an NaF pellet (manufactured by Stella Chemifa Corporation) was inserted into the autoclave so as not to come into contact with the porous $TiO_2$—$SiO_2$ glass body.

The system was heated from the outside of the autoclave using a mantle heater to increase the temperature in the apparatus from room temperature to 80° C. in a heating rate ranging from 0.5 to 2° C./min. Then, while the inside of the apparatus was kept at 80° C., vacuum deaeration was conducted until the pressure in the apparatus reached an absolute pressure of 13,000 Pa or lower and the system was kept for 1 hour. Thereafter, a gas of elemental fluorine ($F_2$) diluted to 20 mol % with nitrogen gas was introduced until the pressure in the apparatus reached a gauge pressure of 0.05 MPa and the system was kept under conditions of a temperature of 80° C. and a gauge pressure of 0.05 MPa for 6 hours.

Then, after the inside gas was purged to lower the pressure to atmospheric pressure and a gas of elemental fluorine ($F_2$) diluted to 20 mol % with nitrogen gas was passed through at a rate of 400 cc/min for 2 hours to renew the gas of elemental fluorine ($F_2$) in the apparatus, the pressure was elevated until the pressure in the apparatus reached a gauge pressure of 0.05 MPa and the system was kept under conditions of a temperature of 80° C. and a gauge pressure of 0.05 MPa for 6 hours. The operation was repeated further twice, and the porous $TiO_2$—$SiO_2$ glass body and the gas of elemental fluorine ($F_2$) were kept under conditions of a temperature of 80° C. and a gauge pressure of 0.05 MPa for 24 hours in total (step (b)).

After the reaction, the weight of the porous $TiO_2$—$SiO_2$ glass body increased by 30 g as compared with the weight before the reaction, so that the introduction of fluorine was confirmed. Also, the weight of the NaF pellet increased by 7 g as compared with the weight before the reaction, so that the adsorption of HF was confirmed.

Thereafter, the resulting glass body was kept at 1,450° C. for 4 hours under reduced pressure, thereby obtaining an F-containing $TiO_2$—$SiO_2$ dense body (step (c)).

The obtained F-containing $TiO_2$—$SiO_2$ dense body was kept at 1,680° C. for 4 hours, thereby obtaining a transparent glass body (step (d)).

The obtained transparent glass body was placed in a carbon mold and heated to 1,700° C. to be formed in a block shape, thereby obtaining a formed glass body (step (e)). After the formed glass body was cooled to 1,000° C. in the furnace without any treatment at a rate of 10° C./hr, it was kept at 1,000° C. for 3 hours and cooled to 950° C. at a rate of 10° C./hr, then kept at 950° C. for 72 hours and cooled to 900° C. at a rate of 5° C./hr, and then kept at 900° C. for 72 hours. Then, the formed glass body was cooled to 500° C. at an average cooling rate of 50° C./hr, followed by allowing it to stand for natural cooling to room temperature. Therefore, the average cooling rate from 1,200° C. to 500° C. was 3.68° C./hr (step (f)).

The glass body manufactured in each of the foregoing Examples 1 to 5 is cut into plates each having a length of about 153.0 mm, a width of about 153.0 mm, and a thickness of about 6.75 mm using an inner diameter saw slicer to manufacture 40 sheets of the plates. Then, chamfering is carried out by a commercially available NC chamfering machine using #120 diamond grindstone, so that outer dimension of each of the length and width is about 152 mm and chamfered width is from 0.2 to 0.4 mm. Thereafter, using 20B double side lapper (manufactured by SPEEDFAM Co., Ltd.), a main surface (surface on which a multilayer or an absorption layer is formed) of the plate is polished until the thickness is about 6.63 mm using, as an abrasive, a slurry obtained by suspending GC #400 substantially composed of SiC (product name, manufactured by Fujimi Corporation) in filtrated water in an amount of from 18 to 20% by mass.

Then, as primary polishing, using 20B double side polisher, both surfaces are polished about 50 μm in total, using as a polishing cloth an urethane-made LP66 (product name, manufactured by Rhodes) and using as an abrasive a slurry obtained by suspending MIREK 801A (product name, manufactured by Mitsui Mining & Smelting Co., Ltd.) containing cerium oxide as a major component, in an amount of from 10 to 12% by mass.

Furthermore, both surfaces are polished about 10 μm in total (secondary polishing) using 20B double side polisher, using a foamed urethane-made Siegal 7355 (product name, manufactured by TORAY COATEX Co., Ltd.) as a polishing cloth and then, final polishing (tertiary polishing) is carried out using another polisher. For the final polishing, colloidal silica (Compol 20: product name, manufactured by Fujimi Corporation) as an abrasive and Belatrix K7512 (product name, manufactured by Kanebo) as a polishing cloth are used.

Then, on these substrates, washing is carried out using a multi-stage automatic washer where a hot solution of sulfuric acid and a hydrogen peroxide solution is used in the first vessel and a neutral surfactant solution is used in the third vessel.

Figure 2:
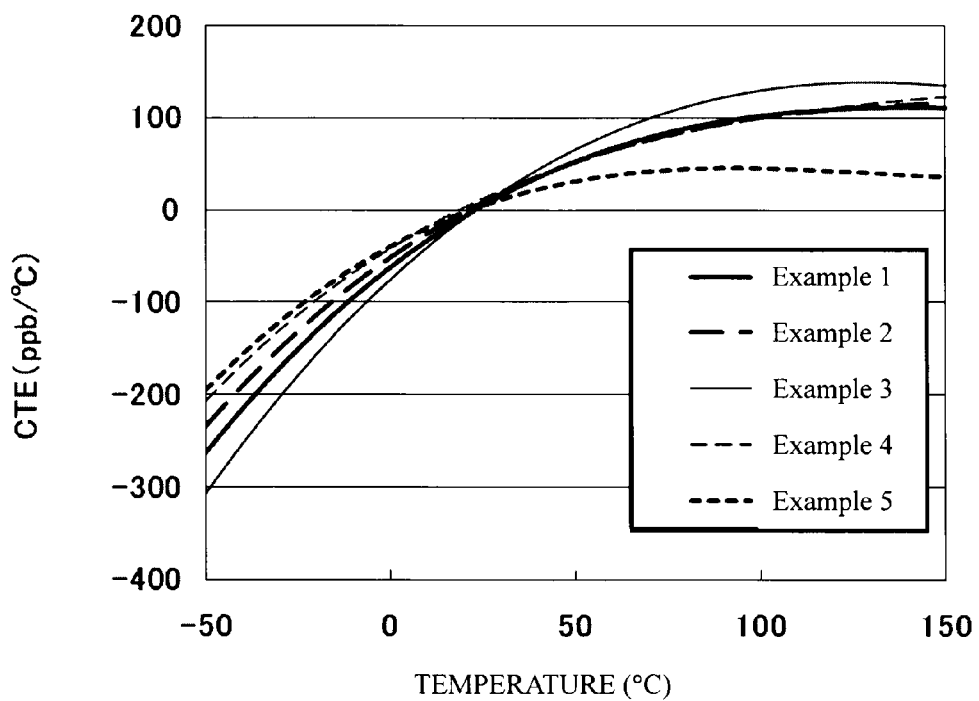
FIG. 2 is a figure showing a temperature change of thermal expansion coefficients in the glasses of Examples 1 to 5 of the invention.

FIG. 2 shows a temperature change of the thermal expansion coefficient of the glass manufactured in each of the foregoing Examples 1 to 5. The thermal expansion coefficient of the glass was measured by using a laser interferometric dilatometer (a laser dilatometer LIX-1 manufactured by ULVAC-RIKO Incorporation). Moreover, results of the measurement of respective physical properties of the glass substrates prepared in the foregoing Examples 1 to 5 are shown in Table 1 and Table 2. With respect to the evaluation methods, the measurements were made in accordance with the above-described measurement methods, respectively. Also, the temperature width where the thermal expansion coefficient was 0±5 ppb/° C. in Table 2 was derived by determining the temperature range where the thermal expansion coefficient was from −5 to 5 ppb/° C. from the curve shown in FIG. 2. Here, Examples 1, 2, and 5 are Invention Examples and Examples 3 and 4 are Comparative Examples.

TABLE 1

|  | $TiO_2$ concentration [wt %] | $Ti^{3+}$ concentration [wt ppm] | $\Delta Ti^{3+}/Ti^{3+}$ | F concentration [wt ppm] | $\Delta F/F$ | $T_{400-700}$ [%] | $T_{300-700}$ [%] | $T_{300-3,000}$ [%] |
|---|---|---|---|---|---|---|---|---|
| Example 1 | 6.7 | 7.1 | 0.09 | — | — | >93.6 | >88.6 | >88.6 |
| Example 2 | 5.9 | 12.1 | 0.09 | 3800 | 0.19 | >93.1 | >82.5 | >82.5 |
| Example 3 | 6.0 | 6.5 | 0.42 | — | — | >93.0 | >82.9 | >82.9 |
| Example 4 | 6.3 | 9.2 | 0.23 | 4400 | 0.31 | >92.7 | >84.0 | >84.0 |
| Example 5 | 6.2 | 12.3 | 0.15 | 6800 | 0.14 | >90.6 | >81.0 | >81.0 |

TABLE 2

|  | Fictive temperature [° C.] | OH group concentration [wt ppm] | Thermal expansion coefficient at from 0 to 100° C., $CTE_{0-100}$ [ppb/° C.] minimum value to maximum value | Thermal expansion coefficient at from −50 to 150° C., $CTE_{-50-150}$ [ppb/° C.] minimum value to maximum value | Temperature width where thermal expansion coefficient is 0 ± 5 ppb/° C. [° C.] |
|---|---|---|---|---|---|
| Example 1 | 960 | 40 | −60 to 100 | −260 to 111 | 4.3 |
| Example 2 | 900 | <10 | −50 to 100 | −230 to 115 | 4.7 |
| Example 3 | 1060 | 40 | −75 to 130 | −310 to 135 | 3.5 |
| Example 4 | 890 | <10 | −40 to 100 | −210 to 125 | 5.0 |
| Example 5 | 820 | <10 | −40 to 45 | −195 to 45 | 6.7 |

Example 1 relates to a $TiO_2$—$SiO_2$ glass, in which the $Ti^{3+}$ concentration was 100 wt ppm or less, the thermal expansion coefficient at from 0 to 100° C., $CTE_{0-100}$, was 0±150 ppb/° C., the internal transmittance in the wavelength range of 400 to 700 nm per a thickness of 1 mm, $T_{400-700}$, was 80% or more, and the ratio of variation of $Ti^{3+}$ concentration to an average value of the $Ti^{3+}$ concentration, $\Delta Ti^{3+}/Ti^{3+}$, was 0.2 or less.

Example 2 relates to an F-containing $TiO_2$—$SiO_2$ glass, in which the $Ti^{3+}$ concentration was 100 wt ppm or less, the thermal expansion coefficient at 0 to 100° C., $CTE_{0-100}$, was 0±150 ppb/° C., the internal transmittance in the wavelength range of 400 to 700 nm per a thickness of 1 mm, $T_{400-700}$, was 80% or more, and the ratio of variation of $Ti^{3+}$ concentration to an average value of the $Ti^{3+}$ concentration, $\Delta Ti^{3+}/Ti^{3+}$, was 0.2 or less. Moreover, the F concentration is 1,000 wt ppm or more, and the ratio of variation of F concentration to an average value of the F concentration, $\Delta F/F$, is 0.2 or less.

Example 3 relates to a $TiO_2$—$SiO_2$ glass, but the ratio of variation of $Ti^{3+}$ concentration to an average value of the $Ti^{3+}$ concentration, $\Delta Ti^{3+}/Ti^{3+}$, exceeded 0.2 and distribution in coloring was observed.

Example 4 relates to an F-containing $TiO_2$—$SiO_2$ glass, but the ratio of variation of $Ti^{3+}$ concentration to an average value of the $Ti^{3+}$ concentration, $\Delta Ti^{3+}/Ti^{3+}$, exceeds 0.2 and distribution in coloring is observed.

Example 5 relates to an F-containing $TiO_2$—$SiO_2$ glass, in which the $Ti^{3+}$ concentration was 100 wt ppm or less, the thermal expansion coefficient at 0 to 100° C., $CTE_{0-100}$, was 0±150 ppb/° C., the internal transmittance in the wavelength range of 400 to 700 nm per a thickness of 1 mm, $T_{400-700}$, was 80% or more, and the ratio of variation of $Ti^{3+}$ concentration to an average value of the $Ti^{3+}$ concentration, $\Delta Ti^{3+}/Ti^{3+}$, was 0.2 or less. Moreover, the F concentration is 1,000 wt ppm or more, and the ratio of variation of F concentration to an average value of the F concentration, $\Delta F/F$, is 0.2 or less. In addition, the temperature width where the thermal expansion coefficient is 0±5 ppb/° C. was 4.0° C. or more.

As a result of flatness measurement on the glass substrates prepared in Examples 1 to 5 using a laser interferometer, data can be obtained all over the measuring region in the cases of the glass substrates of Examples 1, 2, and 5. However, in the glass substrates of Examples 3 and 4, a part of data is missed and thus measurement cannot be carried out all over the region.

The present invention is based on Japanese Patent Application No. 2009-004507 filed on Jan. 13, 2009, the entire contents of which are incorporated hereinto by reference.

INDUSTRIAL APPLICABILITY

The optical member of the invention has a wide temperature region where the thermal expansion coefficient is substantially zero, is excellent in transparency, and is little in distribution of properties such as coloring and an absorption coefficient, and thus can be extremely suitably utilized as an optical member constituting an optical system to be used in EUVL. Moreover, the optical member of the invention is also suitably utilized as a substrate constituting a mold for nanoimprint.

The invention claimed is:

1. An optical member comprising a $TiO_2$-containing silica glass having: a $TiO_2$ concentration of from 3 to 10% by mass; a $Ti^{3+}$ concentration of 100 wt ppm or less and greater than 0 ppm; a thermal expansion coefficient at from 0 to 100° C., $CTE_{0-100}$, of 0±150 ppb/° C.; and an internal transmittance in the wavelength region of 400 to 700 nm per a thickness of 1 mm, $T_{400-700}$, of 80% or more, wherein the optical member has a ratio of variation of $Ti^{3+}$ concentration to an average value of the $Ti^{3+}$ concentration, $\Delta Ti^{3+}/Ti^{3+}$, on an optical use surface, of 0.2 or less.

2. The optical member according to claim 1, comprising a $TiO_2$-containing silica glass that contains F and has an F concentration of 1,000 wt ppm or more.

3. The optical member according to claim 1, comprising a $TiO_2$-containing silica glass having an OH concentration of 600 wt ppm or less.

4. The optical member according to claim 1, comprising a $TiO_2$-containing silica glass having an internal transmittance in the wavelength range of 300 to 3,000 nm per a thickness of 1 mm, $T_{300-3,000}$, of 70% or more.

5. The optical member according to claim 2, comprising a $TiO_2$-containing silica glass having a ratio of variation of F concentration to an average value of the F concentration, $\Delta F/F$, on an optical use surface, of 0.2 or less.

6. The optical member according to claim 1, comprising a $TiO_2$-containing silica glass having a distribution of temperature at which a thermal expansion coefficient is zero, $\Delta COT$, falling within a range of 5° C.

7. A process for carrying out EUV lithography comprising employing the optical member according to claim 1 as a photo mask or as a mirror.

8. A process for producing an optical member comprising a $TiO_2$-containing silica glass that has a ratio of variation of $Ti^{3+}$ concentration to an average value of the $Ti^{3+}$ concentration, $\Delta Ti^{3+}/Ti^{3+}$, on an optical use surface of 0.2 or less, containing F, and having an F concentration of 1,000 wt ppm or more, which process comprises:

depositing and growing quartz glass fine particles obtainable by flame hydrolysis of glass-forming raw materials on a substrate, to thereby form a porous glass body;

keeping said porous glass body in a reaction vessel filled with elemental fluorine ($F_2$) or a mixed gas obtained by diluting elemental fluorine ($F_2$) with an inert gas, to thereby obtain a fluorine-containing porous glass body; and subjecting said fluorine-containing porous glass body to temperature increase to a transparent vitrification temperature, to thereby obtain a fluorine-containing transparent glass body.

9. The optical member according to claim 1, wherein $\Delta Ti^{3+}/Ti^{3+}$ is 0.15 or less.

10. The optical member according to claim 1, wherein $\Delta Ti^{3+}/Ti^{3+}$ is 0.1 or less.

11. The optical member according to claim 1, wherein $\Delta Ti^{3+}/Ti^{3+}$ is 0.05 or less.

12. The optical member according to claim 1, wherein the $TiO_2$ concentration is from 6 to 8% by mass.

13. The optical member according to claim 1, wherein $T_{400-700}$ is 90% or more.

14. The optical member according to claim 4, wherein $T_{300-3000}$ is 80% or more.

15. The optical member according to claim 1, wherein the $Ti^{3+}$ concentration is 20 wt ppm or less.

16. The optical member according to claim 6, wherein $\Delta COT$ is 1° C. or less.

17. The optical member according to claim 3, wherein the OH concentration is 30 ppm or less.

18. The optical member according to claim 1, which has a fictive temperature of 1,100° C. or lower.

19. The optical member according to claim 1, which has a fictive temperature of 850° C. or lower.

* * * * *